United States Patent
Li et al.

(10) Patent No.: US 10,374,543 B2
(45) Date of Patent: Aug. 6, 2019

(54) ULTRACAP-BASED SOLUTIONS FOR RIDE-THROUGH OF SYNCHRONOUS MACHINE DRIVES

(71) Applicant: ABB Technology Ltd., Zürich (CH)

(72) Inventors: Jun Li, Cary, NC (US); Zhiguo Pan, Cary, NC (US); Wen Ouyang, Apex, NC (US); Ora Veli-Matti Leppänen, Äijäpolku (FI); Darren Tremelling, Cary, NC (US)

(73) Assignee: ABB Schweiz AG, Baden (CH)

( * ) Notice: Subject to any disclaimer, the term of this patent is extended or adjusted under 35 U.S.C. 154(b) by 68 days.

(21) Appl. No.: 14/839,970

(22) Filed: Aug. 29, 2015

(65) Prior Publication Data

US 2017/0063280 A1  Mar. 2, 2017

(51) Int. Cl.
| | |
|---|---|
| *H02P 6/32* | (2016.01) |
| *H02P 29/024* | (2016.01) |
| *H02J 7/00* | (2006.01) |
| *H02P 9/10* | (2006.01) |
| *H02J 7/34* | (2006.01) |

(52) U.S. Cl.
CPC .......... *H02P 29/025* (2013.01); *H02J 7/0068* (2013.01); *H02P 9/10* (2013.01); *H02J 7/345* (2013.01)

(58) Field of Classification Search
CPC .............. H02P 6/32; H02P 7/10; H02P 7/282
USPC ..................... 318/154, 158, 400.31, 716, 381
See application file for complete search history.

(56) References Cited

U.S. PATENT DOCUMENTS

| 4,426,613 A * | 1/1984 | Mizuno ................ H02P 9/107 322/19 |
| 5,886,512 A * | 3/1999 | Becerra ................ H02M 3/155 323/282 |
| 6,339,316 B1 * | 1/2002 | Eguchi ................ H02P 9/305 322/28 |
| 8,008,895 B2 | 8/2011 | Joho |
| 8,624,563 B2 * | 1/2014 | Ginet ................ H02P 9/10 322/28 |
| 8,803,468 B2 | 8/2014 | Mazumdar |

(Continued)

OTHER PUBLICATIONS

Bose, Dr. Bimal K, Modern Power Electronic and AC Drives, Prentice Hall, Chapter 9, pp. 439-534, 2002.
(Continued)

*Primary Examiner* — Bickey Dhakal
(74) *Attorney, Agent, or Firm* — Taft Stettinius & Hollister LLP; J. Bruce Schelkopf (57) ABSTRACT

A synchronous machine system comprising a synchronous motor including a stator, stator winding, rotor, and field winding; an AC power supply circuit structured to transmit current to or from the stator winding of the synchronous motor at a controlled frequency and transmit current to or from a power source at a controlled frequency; a DC exciter unit structured to receive power from a power source, convert the received power to DC power at a desired voltage, and supply the converted power across a DC bus to the field winding of the synchronous motor; and an energy storage circuit coupled to the DC bus of the DC exciter unit having at least one ultracapacitor, and structured to receive power from a power source, to charge the ultracapacitor, and to provide power to the field winding of the synchronous motor following a power failure.

19 Claims, 6 Drawing Sheets

(56) References Cited

U.S. PATENT DOCUMENTS

| | | | |
|---|---|---|---|
| 8,866,340 B2 | 10/2014 | Alam et al. | |
| 8,963,476 B2* | 2/2015 | Illiano | H02P 9/123 |
| | | | 310/12.18 |
| 2015/0311695 A1* | 10/2015 | West | H02P 27/06 |
| | | | 361/33 |
| 2017/0057363 A1* | 3/2017 | Huh | B60L 11/18 |

OTHER PUBLICATIONS

Holtz, J., et al., "Controlled AC Drives with Ride-Through Capability at Power Interruption", IEEE Transactions on Industry Applications, Sep./Oct. 1994, vol. 20, Issue 5, pp. 1275-1283.

Burke, A., "Ultracapacitors: why, how and where is the technology," Journal of Power Sources, Nov. 11, 2000, vol. 91, pp. 37-50.

Newman, G., et al., "Voltage Sag Ride Through Improvement of Modern AC Drives: Review of Methods and a Case Study", University of Wollongong, NSW 2522, Australia, Sep. 2001, +6 pgs.

* cited by examiner

ULTRACAP-BASED SOLUTIONS FOR RIDE-THROUGH OF SYNCHRONOUS MACHINE DRIVES

BACKGROUND

The present application relates generally to backup power for synchronous machine systems and more particularly but not exclusively to a backup power system used to provide power to DC exciter unit during a power failure. Present efforts at backup power systems suffer from a number of shortcomings and disadvantages. Existing proposals use complex circuitry and require more expensive and less reliable devices and hardware. Unmet needs include providing synchronous motor control during a power failure, reducing equipment cost, and increasing backup power system reliability. There is a significant need for the unique apparatuses, methods, systems and techniques disclosed herein.

DISCLOSURE

For the purposes of clearly, concisely and exactly describing non-limiting exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art with the benefit of the present disclosure.

SUMMARY

Exemplary embodiments include unique backup power systems, methods, techniques and apparatuses for synchronous machine exciter units. Further embodiments, forms, objects, features, advantages, aspects, and benefits shall become apparent from the following description and drawings.

DETAILED DESCRIPTION OF ILLUSTRATIVE EMBODIMENTS

Figure 1:
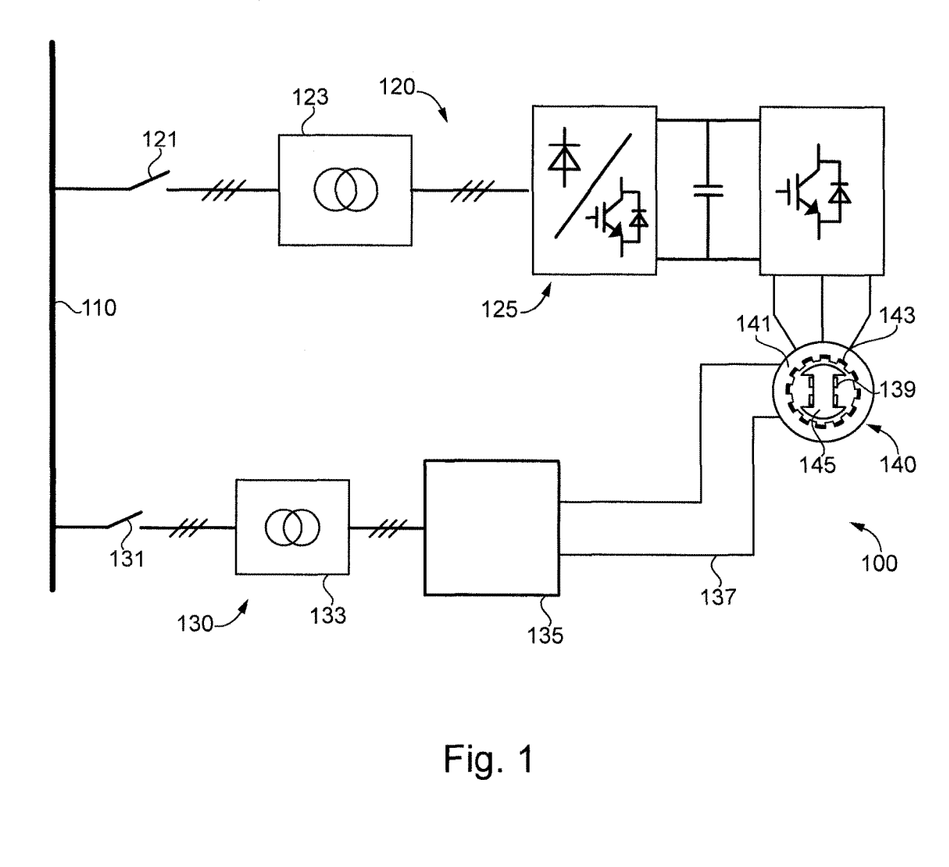
FIG. 1 illustrates an exemplary synchronous machine system.

With reference to FIG. 1 there is illustrated a synchronous machine drive system 100. In the illustrated embodiment, system 100 is coupled to three phase network utility grid 110. In other embodiments, system 100 may be coupled to an alternative power source such as an AC generator, or to DC power sources via a DC/AC converter (e.g., a DC network utility grid, fuel cell array or photovoltaic cell array). It shall be appreciated that system 100 may be implemented in a variety of applications, including machine systems for mining, offshore drilling, industrial processes, and utility operations to name but a few examples.

System 100 includes synchronous motor 140, AC power supply circuit 120 and DC excitation circuit 130. Motor 140 comprises a stator 141, stator winding 143, and rotor 145 as well as field winding 139. The stator 141 of synchronous motor 140 includes stator windings. The rotor 145 is operatively coupled with field winding 139 and structured to rotate about its axis. The field winding 139 is structured to generate a magnetic field which tends to oppose a magnetic field generated by the stator winding 143. In one embodiment, the magnetic field of the stator winding 143 and field winding 139 are structured to rotate the rotor 145. In another embodiment, motor 140 is a generator and the rotation of the rotor and magnetic field of field winding 139 generate a current in the stator winding 143.

AC power supply circuit 120 includes protective device 121 operatively coupled to power source 110 and structured to interrupt the flow of current from power source 110 to motor 140 in the event of a power failure. Protective device 121 is operatively coupled to transformer 123. Transformer 123 is structured to decrease the voltage transmitted from power source 110 or increase the voltage transmitted to power source 110. Transformer 123 is operatively coupled to variable frequency converter 125. Converter 125 is operatively coupled to motor 140 and is structured to control the angular velocity of the rotor by manipulating the input frequency and voltage of the power transmitted to or received by motor 140. It shall be appreciated that a functionally equivalent AC power supply circuit may be used to control the angular velocity of the rotor in accordance with the principles described herein.

DC excitation circuit 130 includes protective device 131 operatively coupled to power source 110 and structured to interrupt the flow of current from power source 110 to field winding 139 in the event of a power failure. Protective device 131 is operatively coupled to transformer 133. Transformer 133 is structured to decrease the voltage transmitted from power source 110. Transformer 133 is operatively coupled to converter 135 which is structured to receive power from power source 110; convert the power into DC power with a desired voltage; and provide DC power to DC bus 137. In certain embodiments, a functionally equivalent circuit may be used to provide power to DC bus 137 in accordance with the principles described herein. DC bus 137 is operatively coupled to field winding 139 and is structured to provide field winding 139 with converted DC power. It shall be appreciated that any or all of the foregoing features of DC excitation circuit 130 may also be present in the additional DC excitation circuits described herein.

Figure 2:
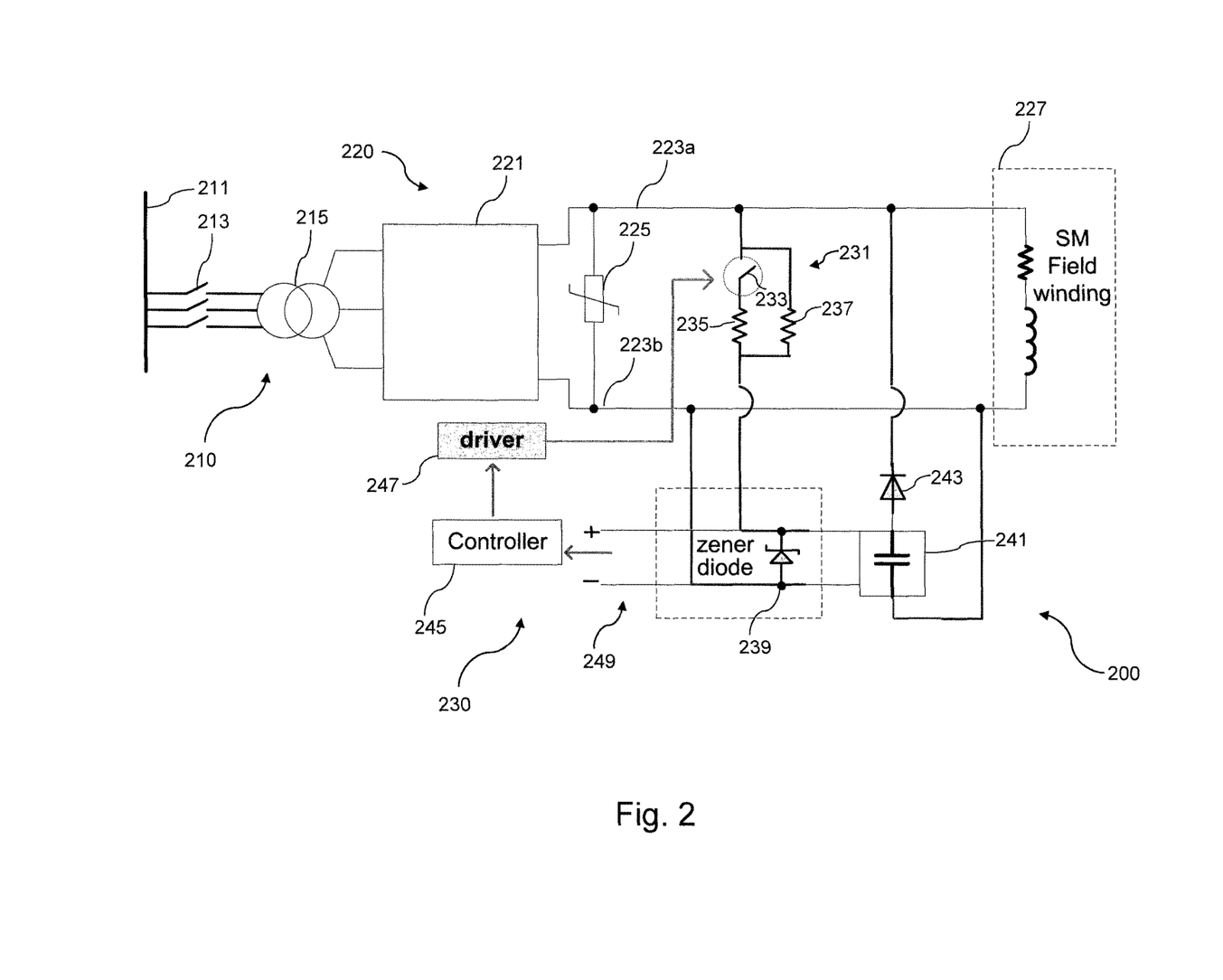
FIG. 2 illustrates an exemplary DC excitation circuit.

With reference to FIG. 2 there is illustrated exemplary DC excitation circuit 200. Circuit 200 includes power source connection network 210, DC exciter unit circuit 220, and energy storage circuit 230. Network 210 includes power source 211, protective device 213, and transformer 215. Protective device 213 is operatively coupled to power source 211. Transformer 215 is operatively coupled to protective device 213.

Exciter unit circuit 220 is coupled to network 210. Exciter unit 220 includes converter 221 which is operatively coupled to network 210; DC bus rail 223a and DC bus rail 223b (collectively, DC bus 223) which are coupled to converter 221; field winding 227 which is operatively coupled across DC bus 223; and varistor 225 which is operatively coupled across DC bus 223. It shall be appreciated that circuit 220, network 210, and the features and components thereof may include some or all of the structural and functional features described above in connection with DC excitation circuit 130.

Energy storage circuit 230 includes current selection circuit 231, Zener diode 239, ultracapacitor 241, switching device 243, controller 245, driver 247, and DC bus 249. Circuit 230 is coupled to circuit 220. More specifically, current selection circuit 231 and switching device 243 and DC bus 249 are coupled to DC bus rail 223a. Current selection circuit 231 includes switch 233 and resistor 235 serially coupled and resistor 237 connected in parallel to switch 233 and resistor 235. Circuit 231 is structured to receive power from DC bus rail 223a and provide power to coupled DC bus 249 at a faster rate when switch 233 is closed than when switch 233 is open. In a preferred embodiment, resistors 235 and 237 are structured with resistive elements sufficient to prevent inrush current damage to circuit 230.

DC bus 249 is operatively coupled to Zener diode 239, ultracapacitor 241, and controller 245, and structured to connect ultracapacitor 241 and controller 245 in parallel and ultracapacitor 241 and Zener diode 239 in an anti-parallel configuration. Controller 245 is structured to measure voltage across ultracapacitor 241 and transmit a signal to operatively coupled driver 247. In a preferred embodiment, controller 245 is a comparator. Driver 247 is structured to operate switch 233. When the voltage across ultracapacitor 241 is significantly less than the maximum desired voltage, controller 245 is structured to signal driver 247 to close switch 233 to increase the current to ultracapacitor 241. When the voltage across ultracapacitor 241 is equal or in close proximity to the desired voltage, controller 245 is structured to signal driver 247 to open the switch to decrease the current to ultracapacitor 241.

Zener diode 239 is structured to limit the maximum voltage across ultracapacitor 241 by having a breakdown voltage equal to the maximum desired voltage across ultracapacitor 241. It shall be appreciated that a functionally equivalent circuit may be used to charge ultracapacitor 241 in accordance with the principles described herein.

Ultracapacitor 241 is coupled to switching device 243 and structured to receive power from circuit 231, store energy, and provide power to field winding 227 during a power failure. In one embodiment, ultracapacitor 241 is an ultracapacitor bank. Device 243 is structured to allow current to pass from ultracapacitor 241 to DC bus rail 223a but block current from DC bus rail 223a to ultracapacitor 241. In one embodiment, switching device 243 is a diode.

When a power failure occurs, the voltage across DC bus 223 decreases below the voltage across ultracapacitor 241. Ultracapacitor 241 discharges stored energy through switching device 243 to field winding 227 in order to maintain normal DC excitation to motor 140. In certain embodiments, motor 140 continues normal operation after a power failure until a power recovery occurs. In other embodiments, motor 140 is stopped after a power failure using electromagnetic braking and waits for a power recovery to resume normal operation.

In one embodiment, motor 140 is a brushless motor and exciter unit 220 and energy storage circuit 230 are incorporated into the rotor of motor 140. Exciter unit 220 is structured to receive AC power from a static exciter which includes a power transformer with a stationary primary winding located outside but operatively coupled to a secondary winding incorporated into the rotor of motor 140 which delivers power to circuit 220.

It shall be appreciated that any or all of the foregoing features of DC excitation circuit 200 may also be present in the additional DC excitation circuits and power sources described herein.

Figure 3:
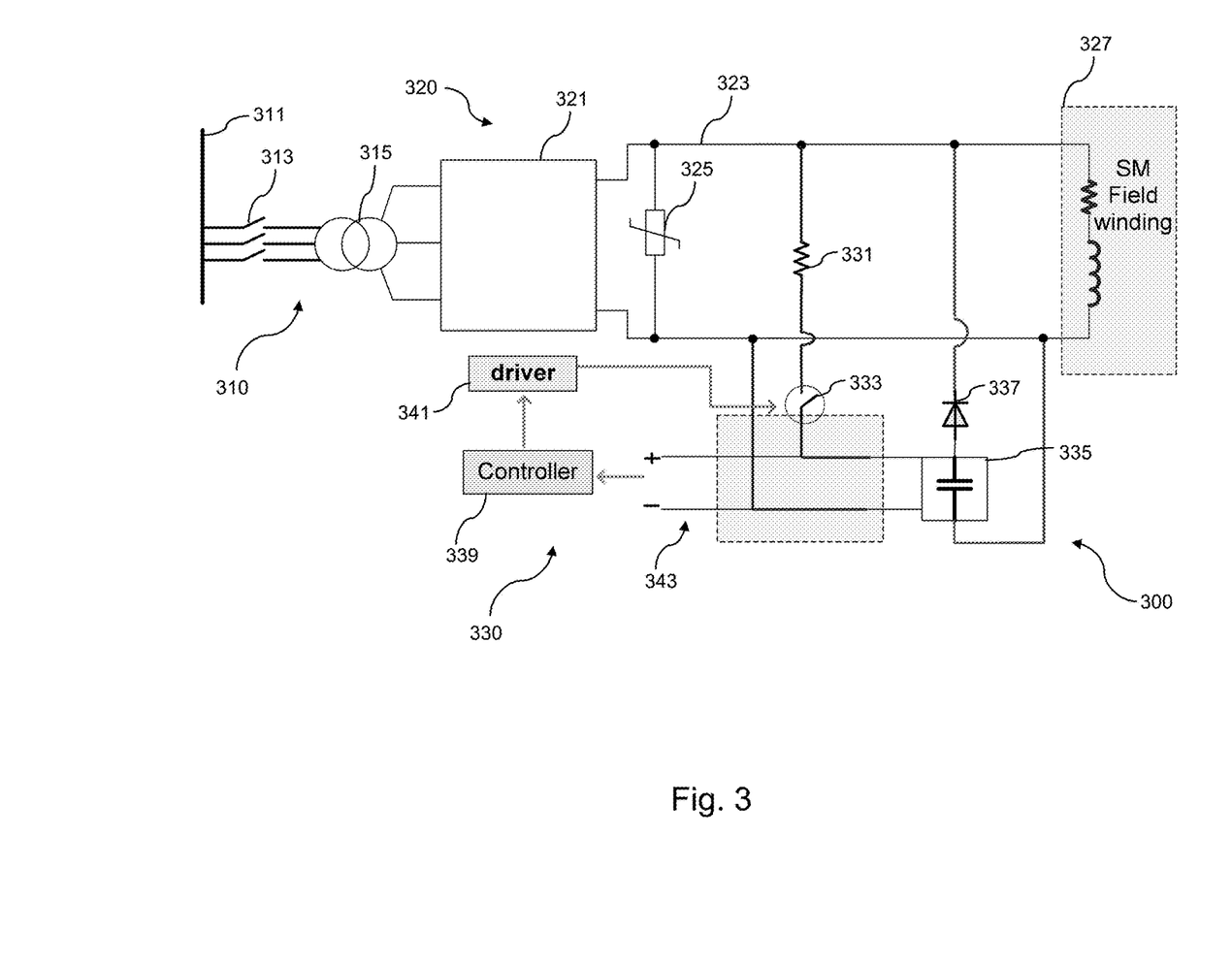
FIG. 3 illustrates another exemplary DC excitation circuit.

With reference to FIG. 3 there is illustrated an exemplary DC excitation circuit 300. Circuit 300 includes power source connection network 310, DC exciter unit circuit 320, and energy storage circuit 330. It shall be appreciated that circuit 300 and the features and components thereof may include some or all of the structural and functional features described above in connection with DC exciter circuit 130 and DC excitation circuit 200.

Network 310 includes power source 311, protective device 313, and transformer 315. Protective device 313 is operatively coupled to power source 311. Transformer 315 is operatively coupled to protective device 313.

Exciter unit circuit 320 is coupled to network 310. More specifically, circuit 320 includes converter 321 which is operatively coupled to transformer 315. DC bus 323 is coupled to converter 321. Field winding 327 is operatively coupled across DC bus 323. Varistor 325 is operatively coupled across DC bus 323.

Energy storage circuit 330 includes resistor 331, switch 333, ultracapacitor 335, switching device 337, controller 339, driver 341, and DC bus 343. Circuit 330 is coupled to circuit 320. More specifically, resistor 331, switching device 337, and DC bus 343 are coupled to DC bus 323. In a preferred embodiment, resistor 331 is structured with a resistive element sufficient to prevent inrush current damage to circuit 330. Switch 333 is structured to receive power from resistor 331 and provide power to coupled DC bus 343 when closed.

DC bus 343 is operatively coupled to ultracapacitor 335 and controller 339, and structured to couple ultracapacitor 335 and controller 339 in parallel. Controller 339 is structured to measure the voltage across ultracapacitor 335 and transmit a signal to operatively coupled driver 341. Driver 341 is structured to operate switch 333. When the voltage across ultracapacitor 335 is less than the maximum desired voltage, controller 339 is structured to signal driver 341 to close switch 333. When the voltage across ultracapacitor 335 is equal to the desired voltage, controller 339 is structured to signal driver 341 to open switch 333. Switching device 337 is coupled to ultracapacitor 335.

It shall be appreciated that any or all of the foregoing features of DC excitation circuit 300 may also be present in the additional DC excitation circuits and power sources described herein.

Figure 4:
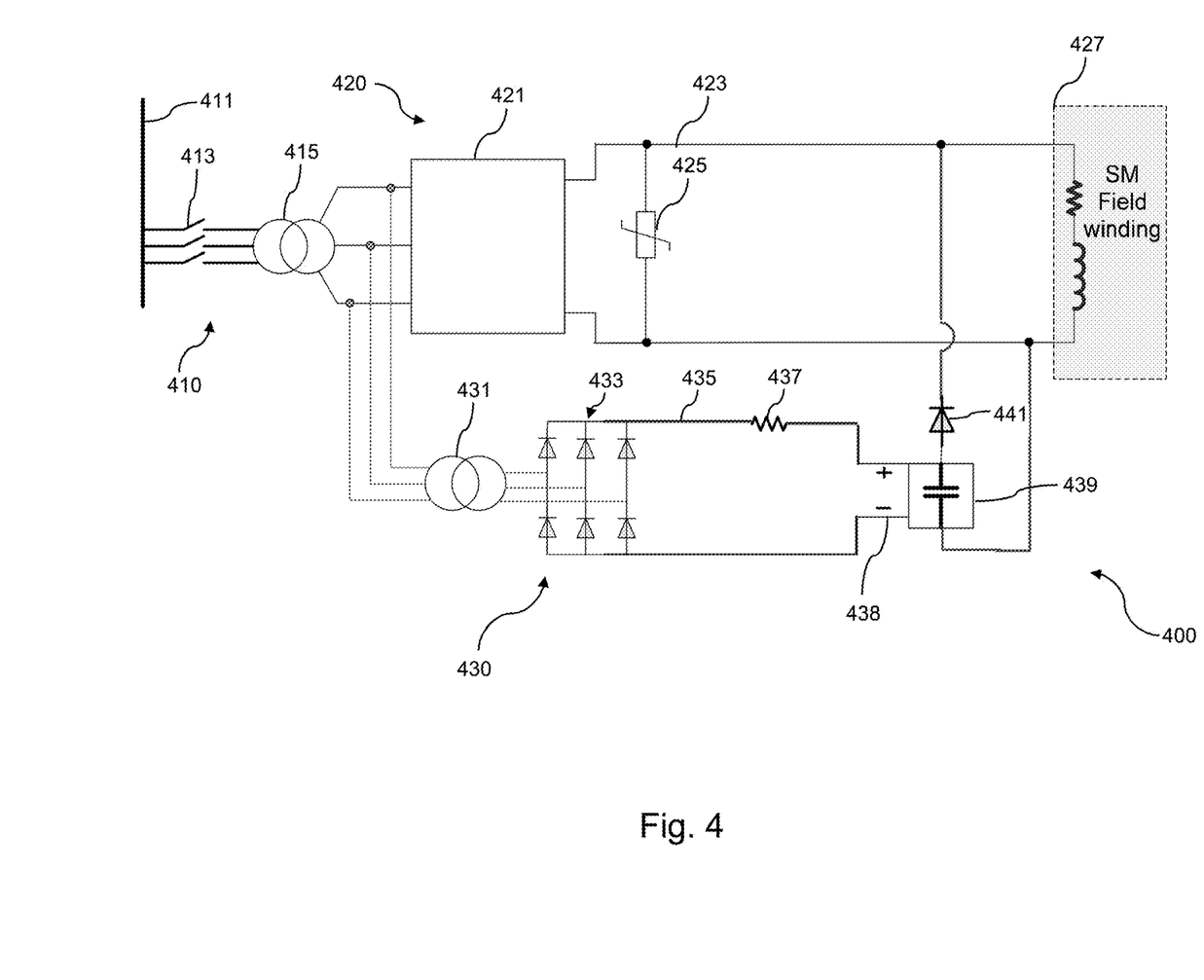
FIG. 4 illustrates another exemplary DC excitation circuit.

With reference to FIG. 4 there is illustrated an exemplary DC excitation circuit 400. Circuit 400 includes power source connection network 410, DC exciter unit circuit 420, and energy storage circuit 430. Circuit 400 is structured to provide DC excitation to motor 140 structured as a brushed motor. It shall be appreciated that circuit 400 and the features and components thereof may include some or all of the structural and functional features described above in connection with DC exciter circuit 130 and DC excitation circuits 200 and 300.

Network 410 includes power source 411, protective device 413, and transformer 415. Protective device 413 is operatively coupled to power source 411. Transformer 415 includes primary windings which are operatively coupled to protective device 413 and secondary windings structured as three distinct windings.

Exciter unit circuit 420 is coupled to network 410. More specifically, circuit 420 includes converter 421 which is operatively coupled to the secondary windings of transformer 415. DC bus 425 is coupled to converter 421. Field winding 427 is operatively coupled across DC bus 423. Varistor 423 is operatively coupled across DC bus 423.

Energy storage circuit 430 includes transformer 431, rectifier 433, DC bus 435, resistor 437, ultracapacitor 439, and switching device 441. Circuit 430 is coupled to network 410 and circuit 420. More specifically, transformer 431 is coupled to the secondary windings of transformer 415, and switching device 441 and DC bus 435 are coupled to DC bus 425.

Transformer 431 is coupled to rectifier 433 and structured to receive AC power from network 410, step down the voltage, and provide AC power to rectifier 433. Rectifier 433 is coupled to DC bus 435 and structured to receive AC power from transformer 431, convert AC power to DC power, and provide DC power to DC bus 435. Resistor 437 is operatively coupled to DC bus 435. In a preferred embodiment, resistor 437 is structured with a resistive element sufficient to prevent inrush current damage to circuit 430. Ultracapacitor 439 is coupled across DC bus 435. Ultracapacitor 439 is structured to receive power from DC bus 438, store energy, and provide power to field winding 427 following a power failure. Switching device 441 is coupled to ultracapacitor 439.

It shall be appreciated that any or all of the foregoing features of DC excitation circuit 400 may also be present in the additional DC excitation circuits and power sources described herein.

Figure 5:
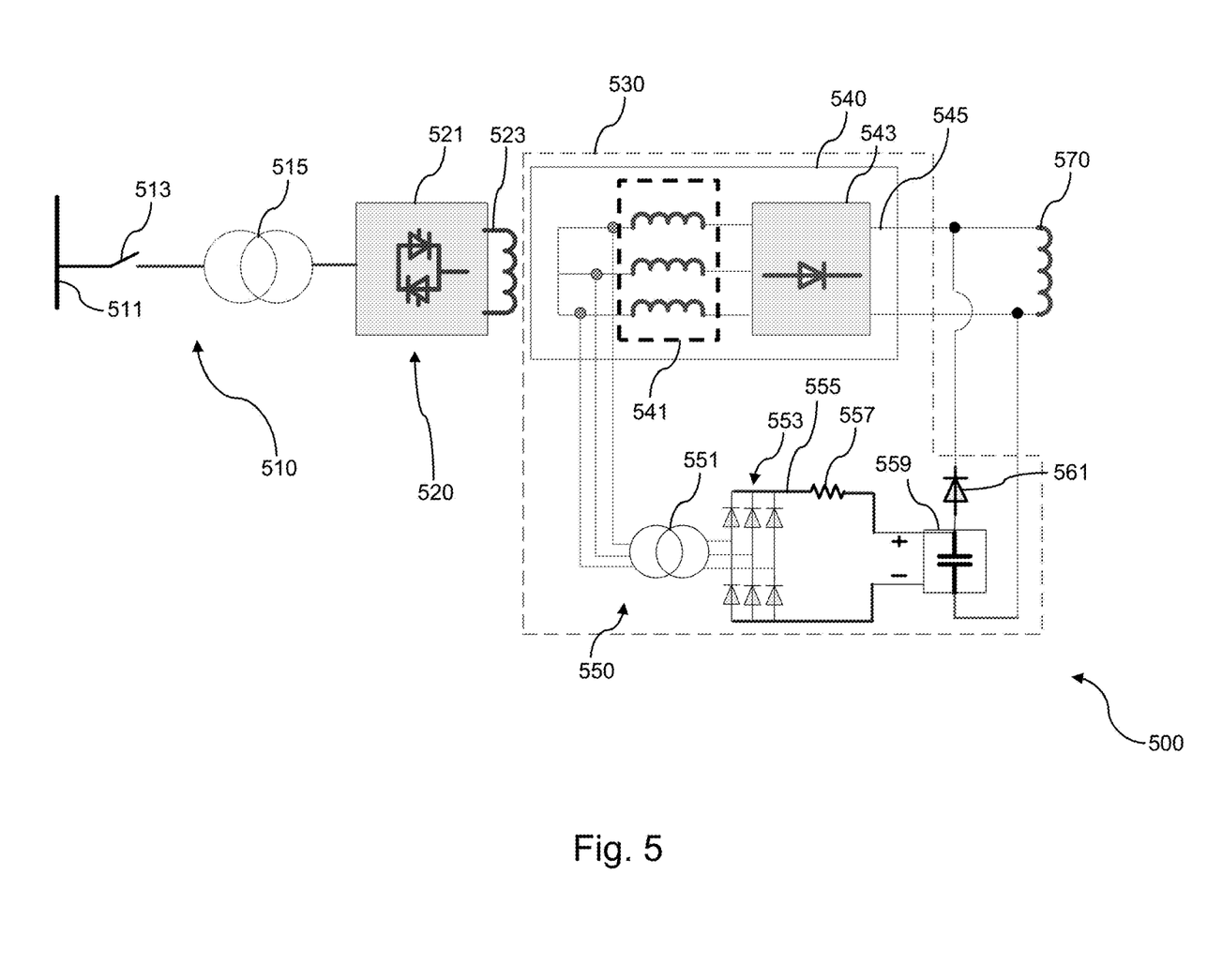
FIG. 5 illustrates another exemplary DC excitation circuit.

With reference to FIG. 5 there is illustrated an exemplary DC excitation circuit 500. Circuit 500 includes power source connection network 510, static exciter 520, rotor 530, DC exciter unit circuit 540, and energy storage circuit 550. Circuit 500 is structured to provide DC excitation to a brushless motor. It shall be appreciated that circuit 500 and the features and components thereof may include some or all of the structural and functional features described above in connection with DC exciter circuit 130 and DC excitation circuits 200, 300, and 400.

Network 510 includes power source 511, protective device 513, and transformer 515. Protective device 513 is operatively coupled to power source 511. Transformer 515 is operatively coupled to protective device 513.

Static exciter 520 includes AC/AC converter 521 and transformer 523. AC/AC converter 521 is operatively coupled to transformer 515 and structured to receive AC power from transformer 515, convert the received AC power, and provide converted AC power to transformer 523. Transformer 523 includes a primary winding. Transformer 523 is structured to receive power from converter 521 at the primary winding and transfer power to secondary windings 541 structured as three distinct windings incorporated into rotor 530. It shall be appreciated that a functionally equivalent power source connection network and/or static exciter may be used to deliver power to the internal circuitry of the rotor in accordance with the principles described herein.

Rotor 530 incorporates exciter circuit 540 and energy storage circuit 550. Exciter unit circuit 540 includes secondary windings 541, rectifier 543, and DC bus 545. Rectifier 543 is coupled to secondary windings 541 and is structured to receive AC power from secondary windings 541, convert the AC power to DC power, and provide DC power to DC bus 545. DC bus 545 is structured to provide power to field winding 570.

Energy storage circuit 550 includes transformer 551, rectifier 553, DC bus 555, resistor 557, ultracapacitor 559, and switching device 561. Circuit 550 is coupled to circuit 540. More specifically, transformer 551 is coupled to secondary windings 541, and switching device 561 and DC bus 555 are coupled to DC bus 545.

Transformer 551 is coupled to rectifier 553 and structured to receive AC power from secondary windings 541, step down the voltage, and provide AC power to rectifier 553. Rectifier 553 is coupled to DC bus 555. Resistor 557 is operatively coupled to DC bus 555. Ultracapacitor 559 is coupled across DC bus 555. Switching device 561 is coupled to ultracapacitor 559.

Figure 6:
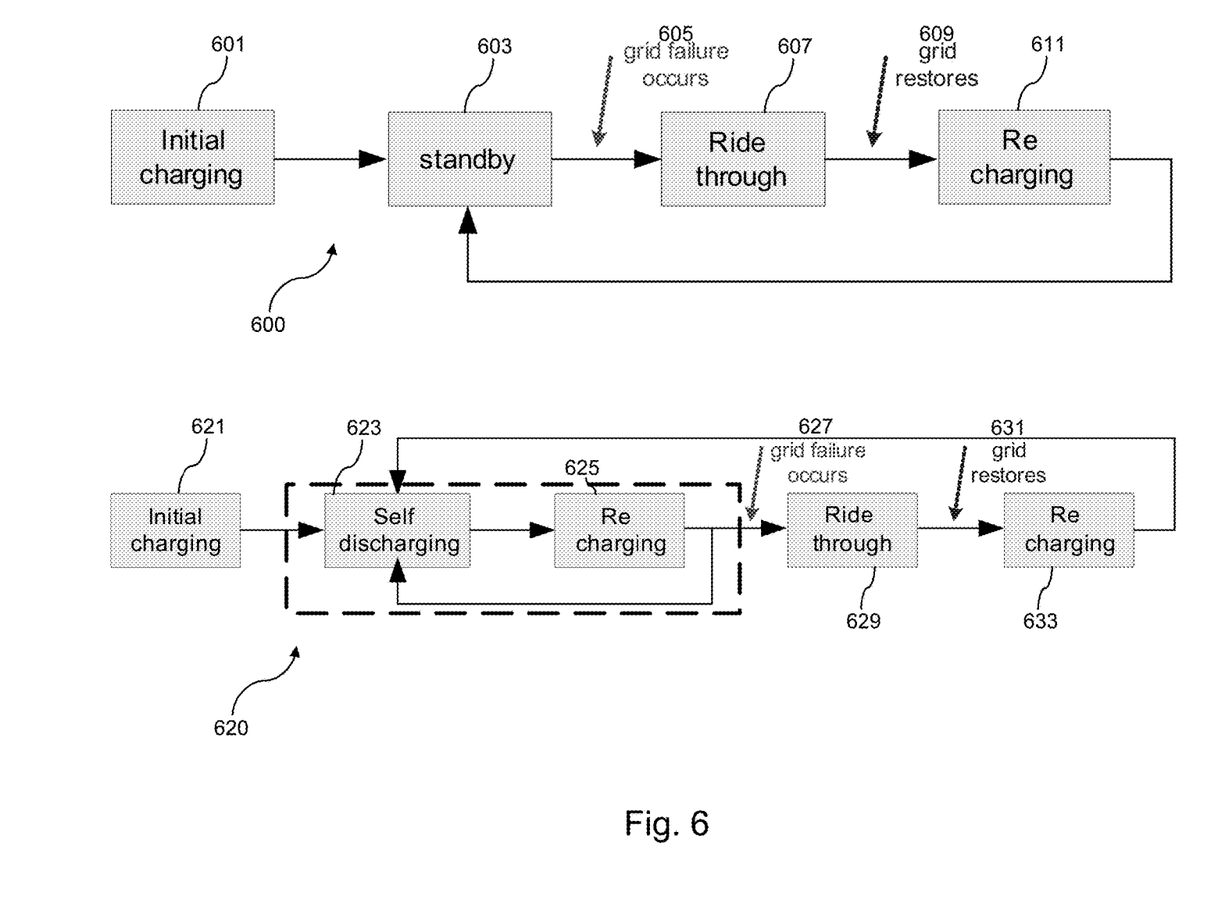
FIG. 6 illustrates processes for backup power regulation.

With reference to FIG. 6 there is illustrated process 600 for backup power regulation. Process 600 may be utilized in connection with circuit topologies such as circuit 200 described in connection with FIG. 2. Process 600 begins at operation 601 where an ultracapacitor is initially charged. Process 600 then proceeds to operation 603 where the ultracapacitor waits until a power failure occurs 605. Process 600 then proceeds to operation 607 where the ultracapacitor provides power to the field winding. In one embodiment, the synchronous motor continues normal operation until power recovery 609. In another embodiment, the synchronous motor is stopped using electromechanical braking and waits for system recovery. Process 600 then proceeds to operation 611 where the ultracapacitor is recharged. Process 600 then returns to operation 603.

With reference to FIG. 6 there is further illustrated process 620 for backup power regulation. Process 620 may be utilized in connection with circuit topologies such as circuits 300, 400 and 500 described in connection with FIGS. 3, 4 and 5, respectively. Process 620 begins at operation 621 where an ultracapacitor is initially charged. Process 620 then proceeds to operation 623 where the ultracapacitor is disconnected from a charging power source and begins to lose charge due to leakage. Process 620 then proceeds to operation 625 where the ultracapacitor is reconnected to the charging power source and recharges. The ultracapacitor is then disconnected from the charging power source again and process 620 returns to operation 623. Process 620 proceeds to operation 629 following a power failure 627. During operation 629, the ultracapacitor provides power to the field winding of a synchronous motor. In one embodiment, the synchronous motor continues normal operation until power recovery 631. In another embodiment, the synchronous motor is stopped using electromechanical braking and waits for power recovery. Process 620 then proceeds to operation 631 where the ultracapacitor is recharged. Process 620 then returns to operation 623.

Further aspects of a number of exemplary embodiments shall now be described. One embodiment is a system comprising: a synchronous motor including a stator, a stator winding, a rotor, and a field winding; an AC power supply circuit structured to provide power to the stator winding of the synchronous motor; a DC exciter unit comprising a converter and DC bus including a first rail and a second rail, the DC exciter unit structured to receive power from a power source and supply DC power to the field winding of the synchronous motor; and an energy storage circuit comprising an ultracapacitor including a first side coupled with the first rail of the DC bus and a second side coupled with the second rail of the DC bus, and a charging circuit portion structured to charge the ultracapacitor using power from the power source, the energy storage circuit structured to passively provide DC power to the field winding of the synchronous motor in the event of a power source failure without requiring operation of an active device.

In certain forms of the foregoing embodiment the charging circuit portion comprises a controllable switch structured to selectably connect the first side of the ultracapacitor to the first rail of the DC bus to charge the ultracapacitor and a controller structured to receive information of the state of the ultracapacitor and control the on/off state of the switch based upon said information. In certain forms a first side of the controllable switch is coupled with the first rail of the DC bus via a resistor and a second side of the controllable switch is coupled with the ultracapacitor. In certain forms the energy storage circuit further comprises a Zener diode coupled in parallel with the ultracapacitor and wherein the controllable switch is structured to selectably connect the Zener diode with the first rail of the DC bus via one of a first resistor and a combination of the first resistor and a second resistor. In certain forms the power supply comprises an AC power grid and the charging circuit portion comprises an AC/DC converter including an AC input side coupled with the power supply and a DC output side coupled with the ultracapacitor. In certain forms the energy storage circuit is incorporated into the structure of the rotor of the synchronous motor. Certain forms comprise a diode coupled between the first side of the ultracapacitor and the first rail of the DC bus and structured to allow current to pass from the ultracapacitor to the DC bus and block current from the DC bus to the ultracapacitor.

Another embodiment is a DC excitation circuit for a synchronous machine, the circuit comprising: a converter structured to receive power from a power source and output DC power; a DC bus including a positive rail and a negative rail, the DC bus structured to receive power from the converter and provide power to a field winding of a synchronous motor; and an energy storage circuit including at least one ultracapacitor structured to receive power from the power source, store the power, and passively provide power to the field winding when the voltage of the DC bus falls below a predetermined level.

In certain forms of the foregoing embodiment the energy storage circuit comprises an active switch structured to selectably connect the positive rail of the DC bus with the positive side of the ultracapacitor. In certain forms the energy storage circuit further includes a Zener diode coupled with the active switch and the ultracapacitor and the active switch is controllable to provide one of a first voltage and a second voltage to the Zener diode, the first voltage being less than a breakdown voltage of the Zener diode and the second voltage being greater than the breakdown voltage. In certain forms the active switch is coupled with a controller, the controller structured to evaluate a voltage across the ultracapacitor and transmit a signal to control the switch. Certain forms comprise a first power transformer structured to receive AC power from the power source, step down the AC power from the power source, and provide the stepped down AC power to the converter; and a second power transformer structured to receive power from the first power transformer, step down the power, and provide the power to a rectifier structured to convert the AC power to DC power, and provide the DC power to a the ultracapacitor. In certain forms the DC excitation circuit is incorporated into the rotor of the synchronous motor, and the power source is coupled to the converter by way of a static exciter having a power transformer and structured to receive power from an AC power source, transmit the AC power through the primary winding of the static exciter transformer to three distinct sections of secondary windings incorporated into the rotor of the synchronous motor. In certain forms the energy storage circuit comprises a second power transformer structured to receive power from the secondary windings of the static exciter transformer, step down the power, and transmit the power to a rectifier, the rectifier structured to receive the AC power from the second power transformer, convert the AC power to DC power, and provide the power to a second DC bus, the DC bus structured to receive DC power from the rectifier and provide DC power to the ultracapacitor; and a resistor operatively coupled to the DC bus. In certain forms the power source is a utility grid.

A further exemplary embodiment is a method for operating a synchronous machine comprising: providing power from a power supply to an exciter circuit comprising a power converter and DC bus; providing power from the exciter circuit to power a field winding of a synchronous machine; charging an ultracapacitor using power from the power supply; and in the event of a low power condition of the power supply, discharging the ultracapacitor to power the field winding without controlling an active device to connect the ultracapacitor to the filed winding.

Certain forms of the foregoing embodiment comprise while discharging the ultracapacitor operating the synchronous machine in one of a ride through mode and a controlled braking mode. Certain forms comprise monitoring the voltage of the ultracapacitor with a controller and controlling a switch to selectably charge the ultracapacitor. In certain forms the charging the ultracapacitor is accomplished by a passive circuit. In certain forms the current used to charge the ultracapacitor is greater than a current necessary to maintain a desired voltage across the ultracapacitor. In certain forms the maximum voltage across the ultracapacitor is less than or equal to the normal voltage across field winding. In certain forms the low power condition of the power supply comprises a power grid failure.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
a synchronous motor including a stator, a stator winding, a rotor, and a field winding;
an AC power supply circuit structured to provide power to the stator winding of the synchronous motor;
a DC exciter unit comprising a converter and DC bus including a first rail and a second rail, the DC exciter unit structured to receive power from a power source and supply DC power to the field winding of the synchronous motor; and
an energy storage circuit comprising an ultracapacitor including a first side coupled with the first rail of the DC bus and a second side coupled with the second rail of the DC bus, and a charging circuit portion structured to charge the ultracapacitor using power from the power source, the energy storage circuit structured to passively provide DC power to the field winding of the synchronous motor in the event of the power source failure without controlling a switching device in a current path of the DC power provided to the field winding from the ultracapacitor;

wherein the DC bus includes a varistor and the ultracapacitor is coupled to the DC bus at a first node between a first side of the varistor and a first side of the field winding and at a second node between a second side of the varistor and a second side of the field winding.

2. The system of claim 1 wherein the charging circuit portion comprises a controllable switch structured to selectably connect the first side of the ultracapacitor to the first rail of the DC bus to charge the ultracapacitor and a controller structured to receive information of a state of the ultracapacitor and control the on/off state of the switch based upon said information.

3. The system of claim 2 wherein a first side of the controllable switch is coupled with a resistor, the first rail of the DC bus is coupled with the resistor, and a second side of the controllable switch is coupled with the ultracapacitor.

4. The system of claim 2 wherein the energy storage circuit further comprises a Zener diode coupled in parallel with the ultracapacitor and wherein the controllable switch is structured to selectably connect the Zener diode with the first rail of the DC bus via one of a first resistor and a combination of the first resistor and a second resistor.

5. The system of claim 1 wherein the energy storage circuit is incorporated into the structure of the rotor of the synchronous motor.

6. The system of claim 1 comprising a diode coupled between the first side of the ultracapacitor and the first rail of the DC bus and structured to allow current to pass from the ultracapacitor to the DC bus and block current from the DC bus to the ultracapacitor.

7. The system of claim 1 wherein the ultracapacitor is coupled across the DC bus adjacent the field winding without intermediate circuit elements therebetween.

8. A DC excitation circuit for a synchronous machine, the circuit comprising:
a converter structured to receive power from a power source and output DC power;
a DC bus including a positive rail and a negative rail, the DC bus structured to receive power from the converter and provide power to a field winding of a synchronous motor; and
a varistor coupled across the DC bus;
an energy storage circuit including at least one ultracapacitor structured to receive power from the power source, store the power, and passively provide power to the field winding when the voltage of the DC bus falls below a predetermined level,
wherein the power flowing from the ultracapacitor to the field winding flows through only uncontrolled passive devices and wherein the ultracapacitor is coupled to the DC bus to discharge current to a first node downstream from the varistor and upstream from the field winding.

9. The DC excitation circuit of claim 8 wherein the energy storage circuit comprises an active switch structured to selectably connect the positive rail of the DC bus with the positive side of the ultracapacitor.

10. The DC excitation circuit of claim 9 wherein the energy storage circuit further includes a Zener diode coupled with the active switch and the ultracapacitor and the active switch is controllable to provide one of a first voltage and a second voltage to the Zener diode, the first voltage being less than a breakdown voltage of the Zener diode and the second voltage being greater than the breakdown voltage.

11. The DC excitation circuit of claim 9 wherein the active switch is coupled with a controller, the controller structured to evaluate a voltage across the ultracapacitor and transmit a signal to control the switch.

12. The DC excitation circuit of claim 8 wherein the power source is a utility grid.

13. The DC excitation circuit of claim 8 wherein the discharge side of the ultracapacitor is coupled to a node of the DC bus immediately adjacent the field winding without intermediate circuit elements.

14. A method for operating a synchronous machine comprising:
providing power from a power supply to an exciter circuit comprising a power converter and DC bus including a varistor coupled across the DC bus;
providing power from the exciter circuit to power a field winding of a synchronous machine;
charging an ultracapacitor using power from the power supply; and
in the event of a low power condition of the power supply, discharging the ultracapacitor to power the field winding without controlling a switching device to operatively connect the ultracapacitor to the field winding;
wherein discharging the ultracapacitor provides current to the DC bus at a first node downstream from the varistor and upstream from the field winding.

15. The method of claim 14 comprising while discharging the ultracapacitor operating the synchronous machine in one of a ride through mode and a controlled braking mode.

16. The method of claim 14 further comprising monitoring the voltage of the ultracapacitor with a controller and controlling a switch to selectably charge the ultracapacitor.

17. The method of claim 14 wherein a current used to charge the ultracapacitor is greater than a current necessary to maintain a desired voltage across the ultracapacitor.

18. The method of claim 14 wherein the maximum voltage across the ultracapacitor is less than or equal to a normal voltage across field winding.

19. The method of claim 14 wherein the low power condition of the power supply comprises a power grid failure.

* * * * *